United States Patent Office.

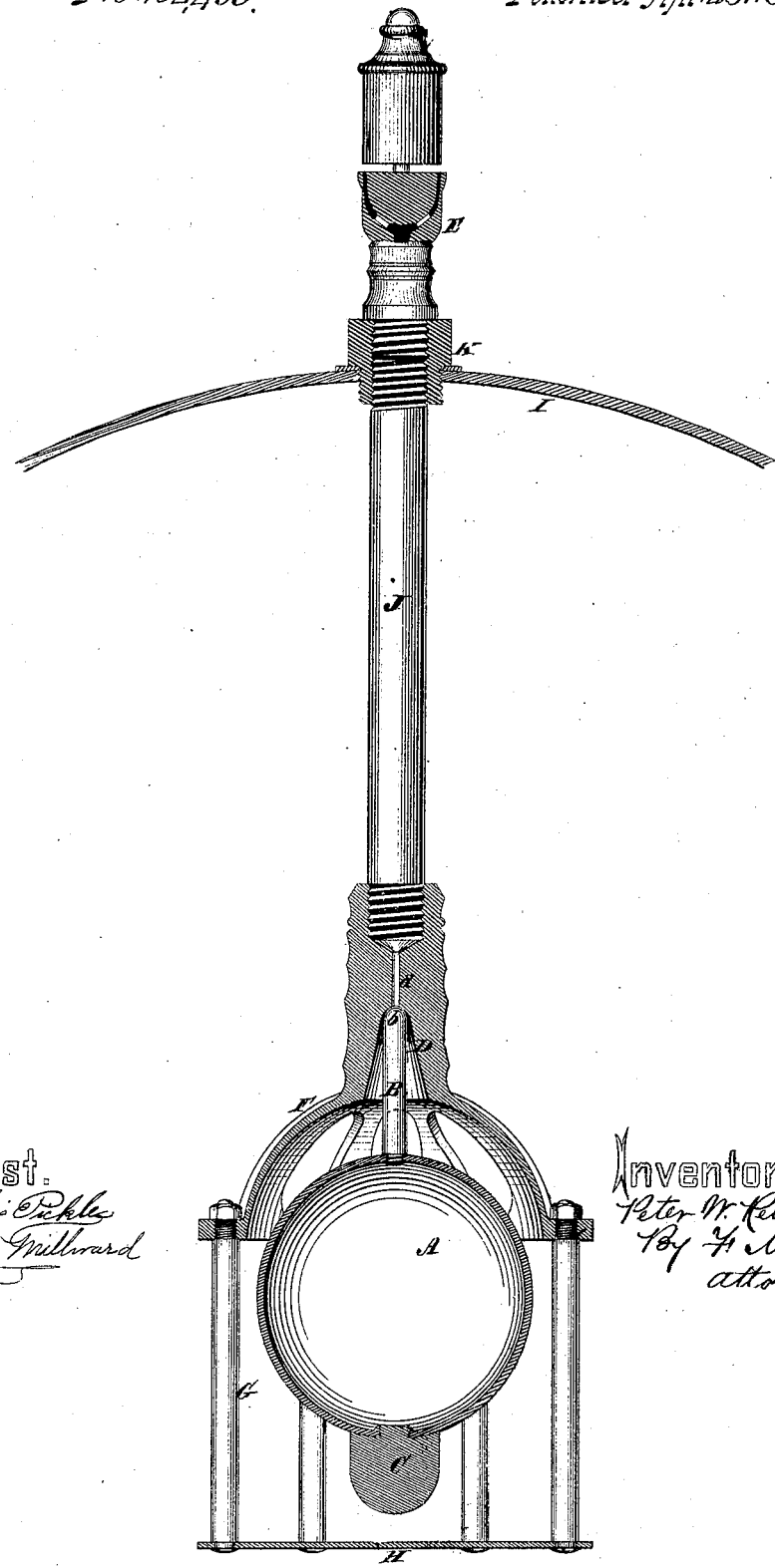

PETER W. REINSHAGEN, OF CINCINNATI, OHIO, ASSIGNOR TO HIMSELF, DANIEL WIEHL, ANDREW P. LUSK, AND JOHN H. BUCKMAN, OF SAME PLACE.

Letters Patent No. 102,433, dated April 26, 1870.

LOW-WATER INDICATOR.

The Schedule referred to in these Letters Patent and making part of the same

*To all whom it may concern:*

Be it known that I, PETER W. REINSHAGEN, of Cincinnati, Hamilton county, State of Ohio, have invented certain new and useful improvements in Low-Water Indicators for Steam-Boilers; and I hereby declare the following to be a sufficiently full, clear and exact description thereof to enable one skilled in the art to which my invention appertains to make and use it, reference being had to the accompanying drawings making part of this specification.

My invention relates to that class of low-water indicators in which a whistle-vent is governed by a float within the boiler, and consists—

First, in a peculiar construction of the valve and seat, whereby a rotary pendulous motion of the valve, &c., is provided for, which serves to prevent sticking.

Second, in the provision and attachment of a counter-weight to the float, which serves to preserve the valve-stem in a vertical position.

Third, in the provision of a cage for the float, which, while it permits the pendulous motion of the stem and float, limits the opening of the valve, and forms a suitable attachment to the boiler and whistle.

The accompanying drawing is a vertical section of an indicator embodying my invention, the drawing being full size, the float and other parts of the apparatus being of the same dimensions as those in actual and successful use.

A is the float, which can be either cast hollow or "spun up" out of sheet metal, in two parts. It is provided with a short stem, B, which terminates in a rounded valve-face $b$, and is also provided with a "counter-weight, C, which serves, when the globe is floating, to preserve the stem B in a vertical position, in order that it may not rest forcibly against the sides of the valve-seat, and occasion friction.

The stem B and "counter-weight" are firmly connected to the float, and soldered or "brazed," to avoid leakage.

The valve-seat D is of conical form, as shown, and terminates in a small aperture, $d$, for the escape of steam to the whistle E.

The seat D is formed in the upper part of the cage which surrounds the float A, the cage being so much larger than the float as to permit of a rotary pendulous motion being imparted to the float and stem by the violent ebullition of the water in the boiler. This provision serves to prevent the valve remaining in one position long enough to "stick." The rounded end of the stem accommodates itself to the seat in any position.

The cage is composed of the cap F, (which contains the seat,) side-rods or columns G, and bottom-plate H, the latter serving to limit the descent of the float and the consequent opening of the valve.

The float is so constructed that it will be almost wholly immersed, when floating, so as to enable a small float to answer the purpose, and the apparatus is so placed in the boiler that the center of the float will be at or near the "low-water mark."

The cage is connected to the boiler-sheet I and whistle E, by means of pipe J and nut K, in the manner shown.

I claim herein as new and of my invention—

1. The stem B, having a rounded or spherically-shaped valve-face $b$, in the described connection with the conical seat D, constructed substantially as described, and for the purpose specified.

2. The counter-weight C, arranged as shown, and for the purpose set forth, in the described combination with the float A and stem B.

3. In the described combination with the float A B C, pipe J, and whistle E, the cage F G H, constructed substantially as described, and for the purpose set forth.

In testimony of which invention I hereunto set my hand.

P. W. REINSHAGEN.

Witnesses:
FRANK MILLWARD,
J. L. WARTMANN.